United States Patent
Dunn et al.

(10) Patent No.: US 6,827,038 B2
(45) Date of Patent: Dec. 7, 2004

(54) ARTICLE FOR GROOMING PETS

(75) Inventors: Steven B. Dunn, Beverly Hills, CA (US); Bryce Fujii, Canoga Park, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days.

(21) Appl. No.: 10/370,922

(22) Filed: Feb. 20, 2003

(65) Prior Publication Data

US 2004/0163607 A1 Aug. 26, 2004

(51) Int. Cl.⁷ .................. A01K 13/00; A45D 29/02
(52) U.S. Cl. .................. 119/600; 119/650; 30/28; 30/124
(58) Field of Search .................. 119/652, 602, 119/600, 605, 607, 650; 30/26–29, 123–125; 132/73.5, 75.4, 75.5; 168/48.1

(56) References Cited

U.S. PATENT DOCUMENTS

| | | | | |
|---|---|---|---|---|
| 1,629,967 A | * | 5/1927 | Rex | 132/75.3 |
| 2,530,216 A | * | 11/1950 | Appel | 30/27 |
| 2,747,330 A | * | 5/1956 | Simpkins | 47/1.7 |
| 2,870,573 A | * | 1/1959 | Scadden | 47/1.01 R |
| 3,275,132 A | | 9/1966 | Hultgren | |
| 4,892,882 A | * | 1/1990 | Tomita et al. | 514/380 |
| 5,168,935 A | * | 12/1992 | Thornbury et al. | 168/48.1 |
| 5,292,203 A | | 3/1994 | Whitman | |
| 5,471,745 A | * | 12/1995 | Wendell | 30/123.3 |
| 5,533,262 A | * | 7/1996 | Clark | 30/29 |
| 5,546,658 A | * | 8/1996 | MacLeod et al. | 30/28 |
| 5,676,643 A | | 10/1997 | Cann et al. | |
| 5,983,498 A | * | 11/1999 | Lieberman et al. | 30/28 |
| 6,289,901 B1 | * | 9/2001 | Singer et al. | 132/76.4 |
| 6,523,264 B1 | * | 2/2003 | Albert et al. | 30/123.3 |
| 6,572,580 B2 | * | 6/2003 | Feldman | 604/46 |

FOREIGN PATENT DOCUMENTS

GB 2312366 * 10/1997 ........... A01L/15/00

* cited by examiner

Primary Examiner—Son T Nguyen
(74) Attorney, Agent, or Firm—Knoble Yoshida & Dunleavy, LLC

(57) ABSTRACT

An article for grooming an animal comprises a nail clipper and a source of styptic material that is mounted to the nail clipper. In the preferred embodiment, the styptic material is provided within a cartridge that is mounted to a handle of the nail clipper. A nail file is preferably provided on an outside casing of the cartridge. The cartridge further includes a bowl shaped application area that may be used to conveniently apply the styptic to the animal during or after clipping.

10 Claims, 7 Drawing Sheets

ARTICLE FOR GROOMING PETS

BACKGROUND OF THE INVENTION

1. Field of the Invention

This invention relates generally to the field of pet care and grooming. More specifically, this invention relates to an improved nail clipper assembly for cutting the nails of pets that are not being naturally worn down by the pet's daily activity.

2. Description of the Related Technology

Pets such as dogs, cats and birds have nails that will continue to grow naturally even when the daily activity of the pet is not sufficient to wear the nails down to an appropriate length. Overgrown nails make walking uncomfortable and lead to soreness and other leg problems for the pet. For this reason, a properly groomed pet will have its nails inspected and trimmed to protect the elderly and young children from scratches as well as prevent damage to floors and furniture. Nail trimming is a recommended monthly procedure for house pets that do not wear down their nails naturally on outdoor concrete and asphalt surfaces. To correctly accomplish the task of trimming the pet's nails, the nail must be cut and then filed to remove burrs and sharp edges. A number of pet nail clippers are commercially available for use in the clipping process.

When trimming a pet's nails, there is a significant risk of overtrimming, in which case a vein may be severed, causing the animal to bleed. This is commonly known as "quicking" the animal. Quicking is especially prevalent with dark-colored nails in which the vein is difficult to visually distinguish. When quicking occurs, it is desirable to apply styptic material to stop the bleeding. Styptic material is sold separately for this purpose in pet supply stores.

Animal grooming is a time-consuming task, especially for animal owners who have otherwise busy lives. It is time-consuming to separately purchase, store and organize the large number of articles and materials that are necessary to properly groom an animal such as a cat or a dog. A need exists for any system, article or process that will lighten the burden for pet owners in this regard.

SUMMARY OF THE INVENTION

Accordingly, it is an object of the invention to provide an improved article for grooming pets that will reduce the large number of articles and materials that will need to be purchased and maintained in order to properly care for an animal.

In order to achieve the above and other objects of the invention, an article for grooming an animal according to a first aspect of the invention includes a nail clipper and a source of a styptic material that is being physically associated with the nail clipper.

According to a second aspect of the invention, an apparatus for dispensing and applying a styptic material to a nail of an animal includes a container having a styptic material disposed therein, the container having a dispensing opening through which styptic material may be dispensed; and a rigid application surface that is adjacent to the dispensing opening.

According to a third aspect of the invention, an article for grooming an animal includes a pet nail clipper; and a nail file releasably mounted to the pet nail clipper.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
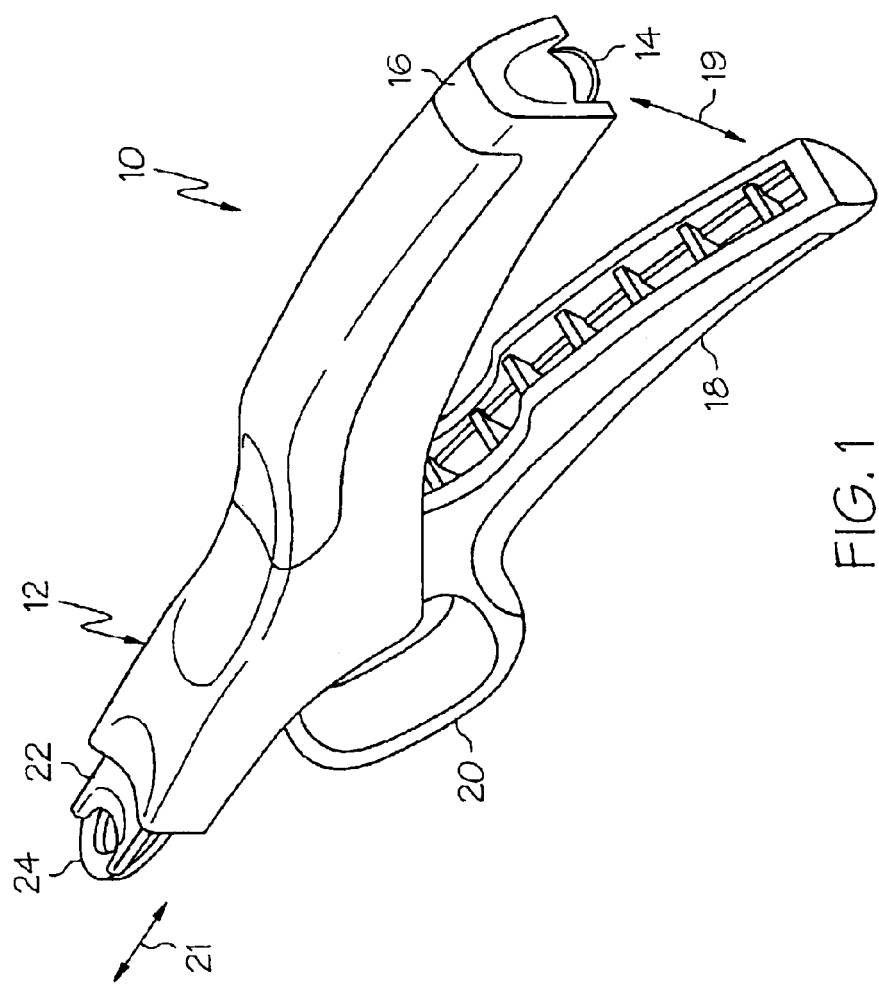
FIG. 1 is a perspective view of a nail clipper assembly that is constructed according to a first, preferred embodiment of the invention.

Referring now to the drawings, wherein like reference numerals designate corresponding structure throughout the views, and referring in particular to FIG. 1, an article 10 for grooming an animal according to a first, preferred embodiment of the invention is depicted in FIG. 1. As may be seen in FIG. 1, article 10 includes a nail clipper 12 having a source 14 of styptic material mounted thereto. Nail clipper 12 includes a first handle 16 and a second handle 18 that are movable with respect to each other in a first plane of motion 19 in order to provide relative movement between a first cutting blade 22 and a stationary anvil 24. Cutting blade 22 moves with respect to anvil 24 in a second plane of motion 21 that in this embodiment of the invention is substantially perpendicular to the first plane of motion 19. As may be seen in FIG. 2, a biasing spring 26 is provided to relatively bias the first and second handles 16, 18 to an open position.

According to one important aspect of the invention, a finger guard 20 is provided so as to be integral to the second handle 18. Finger guard 20 is radiused so as to define a finger opening in which a user's finger will be positioned during use of the nail clipper 12. The presence of the finger guard 20 both properly positions the user's finger as well as permitting the nail clipper 12 to be held by just one finger while it is being carried.

Figure 2:
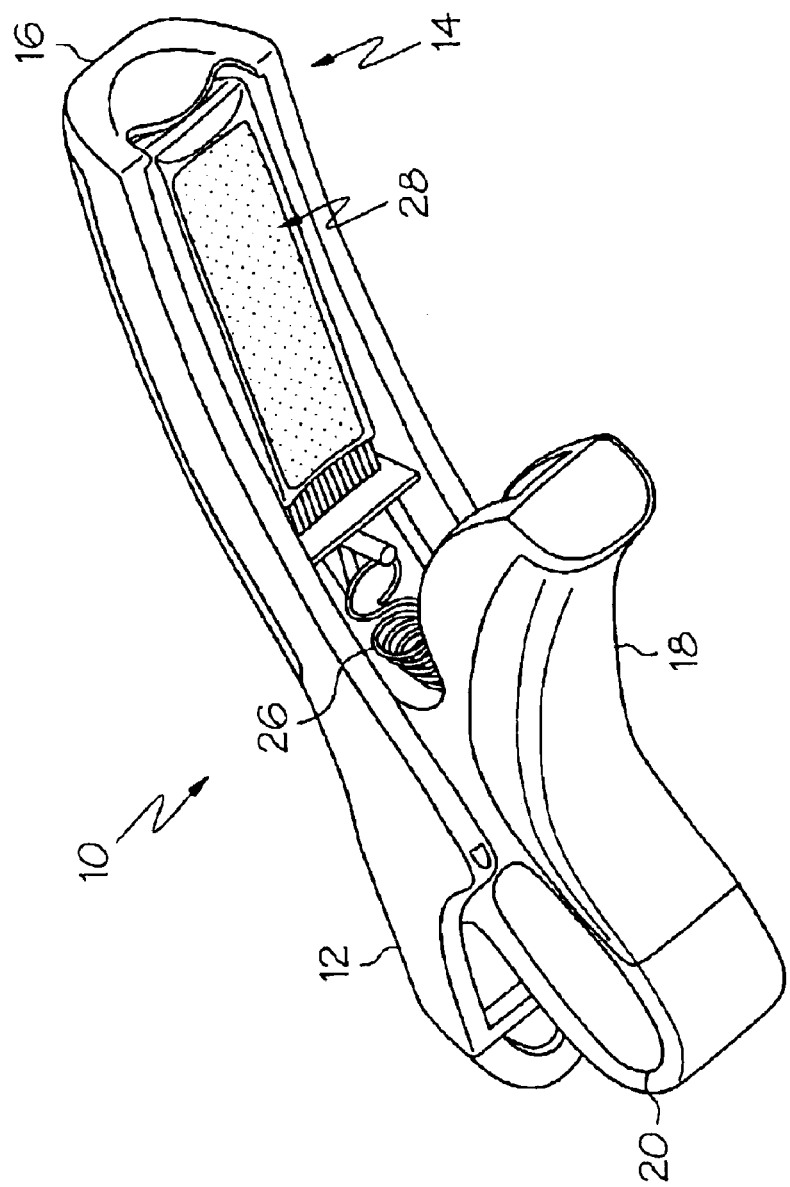
FIG. 2 is a different perspective view of the nail clipper assembly that is depicted in FIG. 1.
Figure 3:
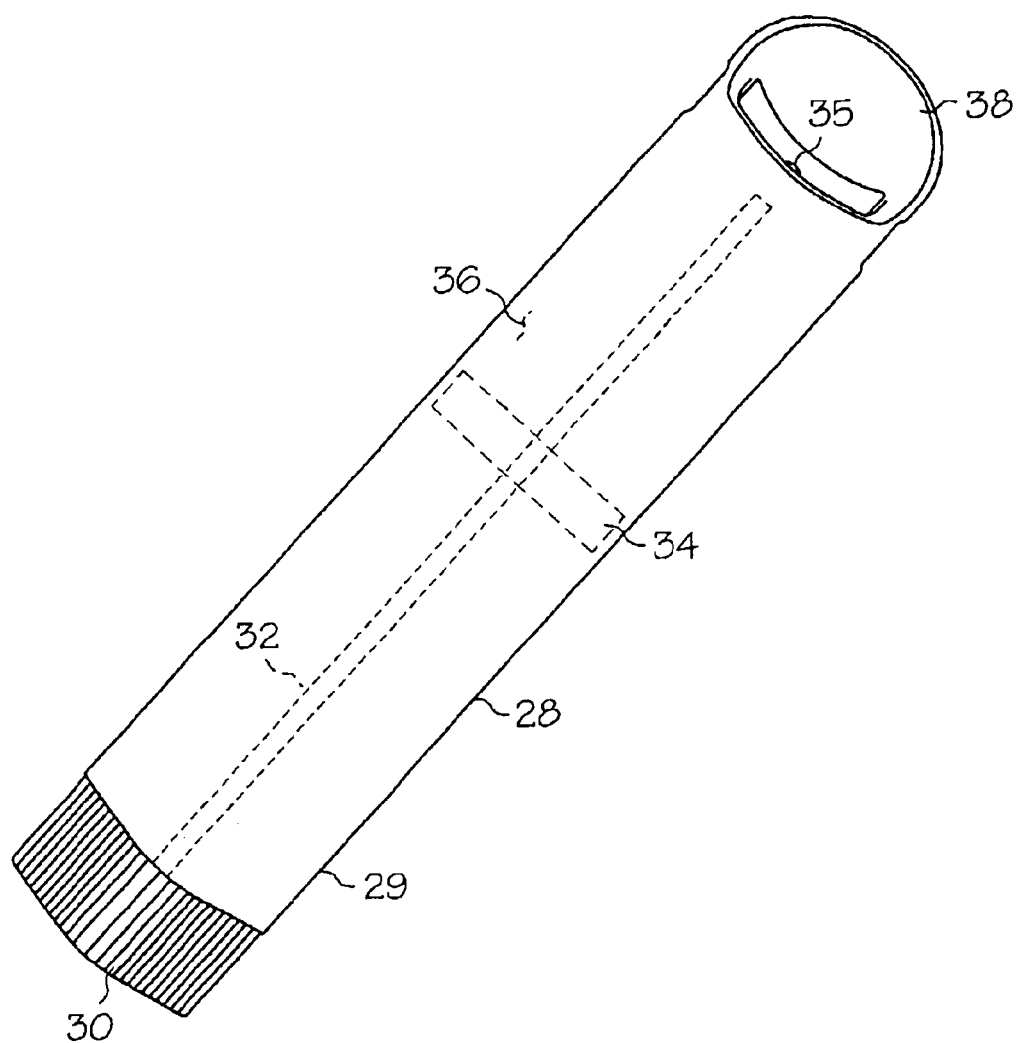
FIG. 3 is a perspective view of a cartridge that is part of the assembly that is depicted in FIGS. 1 and 2.
Figure 4:
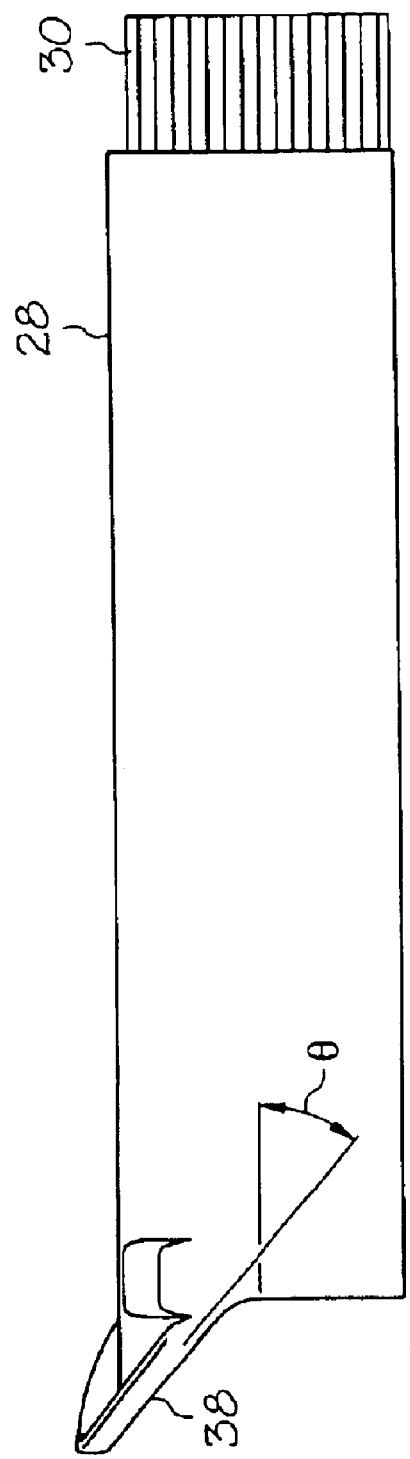
FIG. 4 is a side elevational view of the cartridge.

Referring briefly to FIG. 2, it will be seen that the source 14 of styptic material is preferably embodied as a removable cartridge 28 that is secured within the first handle 16. Removable cartridge 28 is depicted in detail in FIGS. 3-5. It preferably includes an outer wall 29 that defines an interior space in which styptic material 36 is provided and a thumbwheel 30 that is connected to an internal threaded rod 32. Threaded rod 32 is engaged with a push plate 34 that engages the styptic material 36 when the thumbwheel 30 and hence the threaded rod 32 are rotated, thus expressing a controlled amount of styptic material from an opening 35 in the cartridge 28 that is positioned in an end of the cartridge 28 that is opposite from the thumbwheel 30. The styptic material is preferably provided within a matrix of wax-like material. Alternatively, it could be provided in another form, such as in powdered form.

According to another important aspect of the invention, cartridge 28 further includes an application surface 38 that is positioned at the end of the cartridge 28 adjacent to the opening 35. Application surface 38 is ideally shaped to apply or pack in the styptic material 36 to the hollowed opening of the cut nail of a pet who is being groomed. As may be seen in FIG. 4, the application surface is preferably concave and is preferably positioned at an angle Θ with respect to a longitudinal axis of the cartridge 28. Angle Θ is preferably within a range of plus 45 degrees to minus 45 degrees. Alternatively, the application surface 38 could be shaped so as to be a flat surface, a flat surface that is provided with containing structure to prevent the styptic material 36 from falling to the ground, or alternative, equivalent structure.

Figure 5:
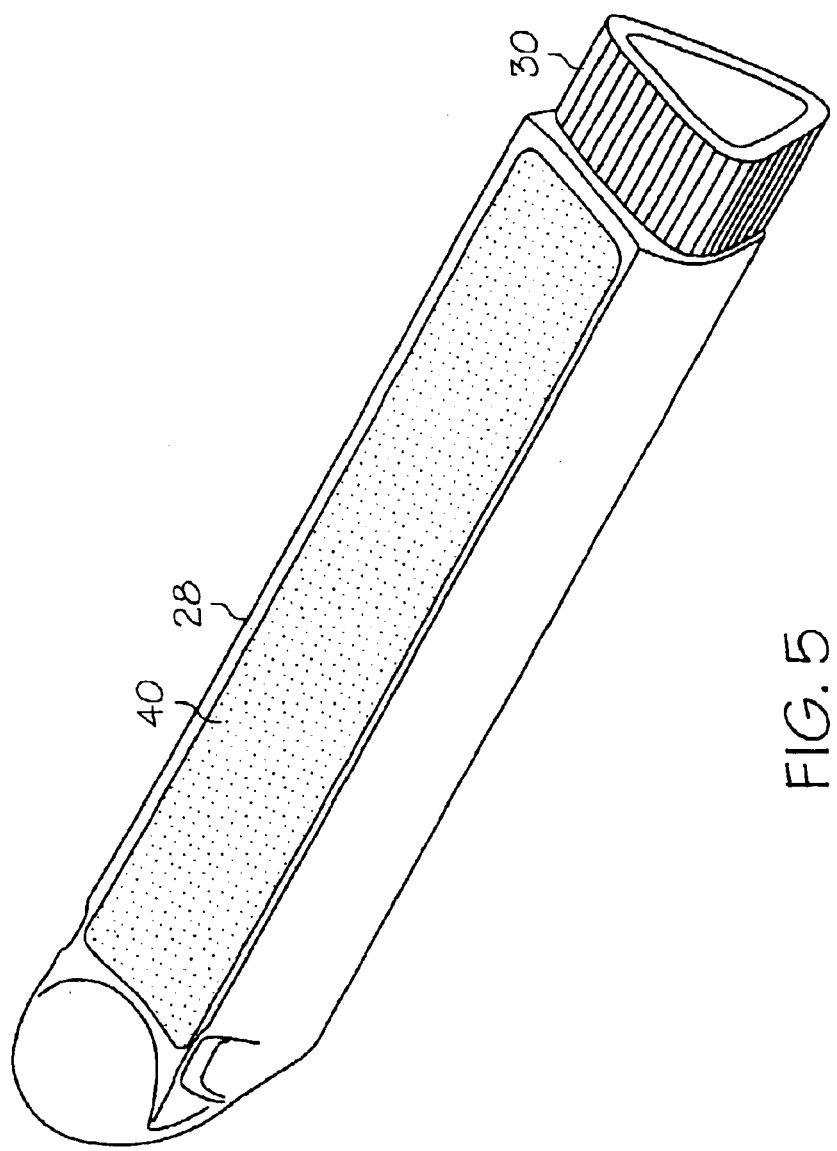
FIG. 5 is a different perspective view of the cartridge.

Advantageously, as shown in FIG. 5, cartridge 28 further has a nail file 40 provided on one surface thereon. Nail file 40 may be used to smooth the severed nail of a pet after clipping. In the preferred embodiment, nail file 40 includes a roughened surface such as an emery board that is attached to cartridge 28. Alternatively, nail file 40 may be provided by molding a roughened surface directly into the side of the cartridge 28, or with a nail file element that is detachable from or otherwise mounted to the cartridge 28.

Figure 6:
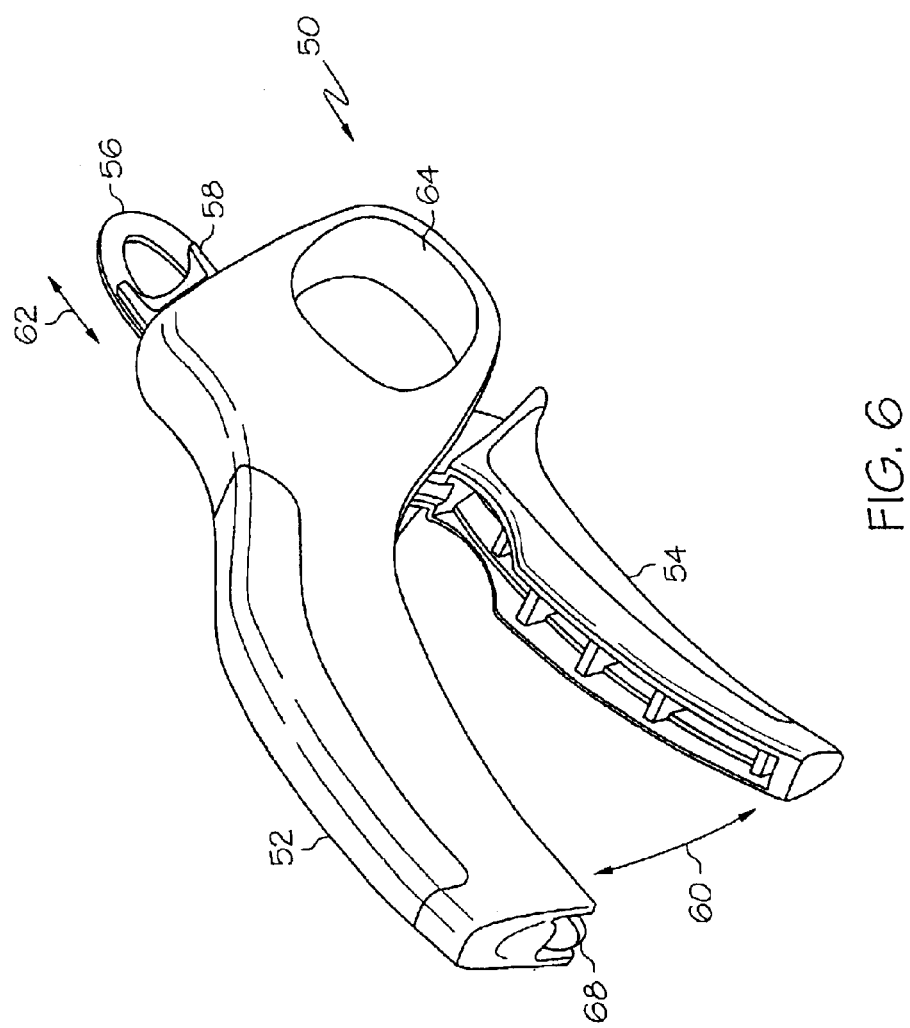
FIG. 6 is a perspective view of a nail clipper assembly that is constructed according to a second embodiment of the invention.

A clipper assembly 50 according to a second embodiment of the invention is depicted in FIG. 6. In this embodiment, a first handle 52 is relatively movable with respect to a second handle 54 in a first plane of motion 60 in order to provide relative movement between a first blade 56 and a second blade 58 in a second plane of motion 62 that in this embodiment is substantially parallel to the first plane of motion 60. First handle 52 includes a finger guard 64 that is similar in its form and function to the finger guard described above in reference to the first embodiment of the invention. A source 68 of styptic material is provided within the first handle 52 in the manner that is described above with reference to the first embodiment. It has been found that this relative orientation between the handles and the cutting blades provides greater convenience when cutting the nails of certain types of pets, particularly smaller pets.

Figure 7:
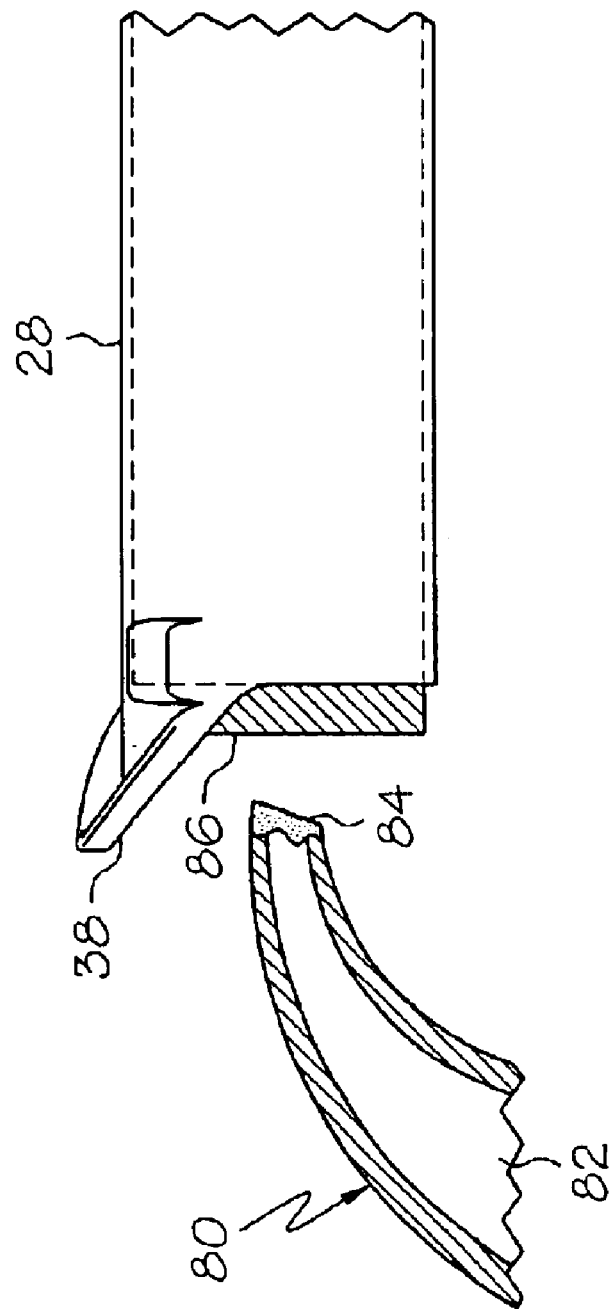
FIG. 7 is a diagrammatical view depicting use of the preferred embodiment of the invention.

FIG. 7 is a diagrammatical view depicting use of an article according to the preferred embodiment of the invention to apply styptic material to a cut nail 80 of an animal. As may be seen in FIG. 7, cut nail 80 has a hollow center 82 containing a number of veins that will bleed when cut at a location 84. Using the application surface 38, styptic material 86 from the cartridge 28 is packed into the cut end 84 in order to block the opening that was created in the hollow nail when the animal was quicked. The convenience of application that is afforded by the invention will become apparent when viewing FIG. 7.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An article for grooming an animal, comprising:
   a nail clipper; and
   a container containing a styptic material, said container mounted to said nail clipper.

2. An article for grooming an animal according to claim 1, wherein said container is releasably mounted to said nail clipper.

3. An article for grooming an animal according to claim 2, wherein said nail clipper comprises a handle portion, and wherein said container is releasably mounted to said handle portion.

4. An article for grooming an animal according to claim 2, further comprising means for advancing styptic material out of the container.

5. An article for grooming an animal according to claim 2, further comprising a rigid application surface for applying styptic material to a nail.

6. An article for grooming an animal according to claim 5, wherein said application surface is concave.

7. An article for grooming an animal according to claim 5, wherein said application surface is integral with said container.

8. An article for grooming an animal according to claim 6, further comprising a dispensing opening defined in said container, and wherein said application surface is adjacent to said dispensing opening.

9. An article for grooming an animal according to claim 1, further comprising a nail file.

10. An article for grooming an animal, comprising:
    a pet nail clipper;
    a nail file releasably mounted to said pet nail clipper; and
    a container containing a styptic material, said container mounted to said pet nail clipper.

* * * * *